(12) United States Patent
Xu et al.

(10) Patent No.: US 12,141,440 B2
(45) Date of Patent: Nov. 12, 2024

(54) PERFORMING RESYNCHRONIZATION JOBS IN A DISTRIBUTED STORAGE SYSTEM BASED ON A PARALLELISM POLICY

(71) Applicant: VMware LLC, Palo Alto, CA (US)

(72) Inventors: Yiqi Xu, Redwood City, CA (US);
Enning Xiang, San Jose, CA (US);
Eric Knauft, Palo Alto, CA (US);
Pascal Renauld, Palo Alto, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/048,184

(22) Filed: Oct. 20, 2022

(65) Prior Publication Data
US 2023/0055813 A1    Feb. 23, 2023

Related U.S. Application Data

(63) Continuation of application No. 16/504,204, filed on Jul. 5, 2019, now Pat. No. 11,494,083.

(51) Int. Cl.
| | |
|---|---|
| *G06F 3/06* | (2006.01) |
| *G06F 9/38* | (2018.01) |
| *G06F 9/455* | (2018.01) |
| *G06F 9/48* | (2006.01) |
| *G06F 9/50* | (2006.01) |
| *G06F 9/52* | (2006.01) |

(52) U.S. Cl.
CPC .......... *G06F 3/0613* (2013.01); *G06F 3/0653* (2013.01); *G06F 9/3869* (2013.01); *G06F 9/45558* (2013.01); *G06F 9/4881* (2013.01); *G06F 9/5038* (2013.01); *G06F 9/52* (2013.01); *G06F 3/067* (2013.01)

(58) Field of Classification Search
CPC ............................. G06F 3/0613; G06F 3/0653
See application file for complete search history.

(56) References Cited

U.S. PATENT DOCUMENTS

| | | | |
|---|---|---|---|
| 6,408,005 B1 * | 6/2002 | Fan | ...................... H04L 12/5602 370/468 |
| 10,158,500 B2 | 12/2018 | Chhabra et al. | |
| 10,277,512 B1 * | 4/2019 | Williams | ................ H04L 47/36 |
| 10,313,251 B2 | 6/2019 | Kalman et al. | |

(Continued)

*Primary Examiner* — Nanci N Wong
(74) *Attorney, Agent, or Firm* — King Intellectual Asset Management

(57) ABSTRACT

The disclosure herein describes performing resynchronization ("resync") jobs in a distributed storage system based on a parallelism policy. A resync job is obtained from a queue and input/output (I/O) resources that will be used during execution of the resync job are identified. Available bandwidth slots of each I/O resource of the identified I/O resources are determined. The parallelism policy is applied to the identified I/O resources and the available bandwidth slots. Based on the application of the parallelism policy, a bottleneck resource of the I/O resources is determined and a parallel I/O value is calculated based on the available bandwidth slots of the bottleneck resource, wherein the parallel I/O value indicates a quantity of I/O tasks that can be performed in parallel. The resync job is executed using the I/O resources, the execution of the resync job including performance of I/O tasks in parallel based on the parallel I/O value.

17 Claims, 6 Drawing Sheets

(56) References Cited

U.S. PATENT DOCUMENTS

| | | | |
|---|---|---|---|
| 2003/0170012 A1* | 9/2003 | Cochran | G06F 11/2082 |
| | | | 386/234 |
| 2003/0182276 A1* | 9/2003 | Bossman | G06F 16/217 |
| 2009/0307432 A1 | 12/2009 | Fleming | |
| 2013/0054808 A1 | 2/2013 | Hildebrand et al. | |
| 2013/0111031 A1 | 5/2013 | Hoffman | |
| 2014/0208048 A1* | 7/2014 | Deguchi | G06F 11/2074 |
| | | | 711/162 |
| 2014/0289833 A1 | 9/2014 | Briceno et al. | |
| 2015/0248254 A1* | 9/2015 | Matsunaga | G06F 3/0685 |
| | | | 711/5 |
| 2015/0326441 A1* | 11/2015 | Smith | H04L 45/125 |
| | | | 370/255 |
| 2016/0210061 A1 | 7/2016 | Soncodi et al. | |
| 2018/0032373 A1 | 2/2018 | Chen et al. | |
| 2018/0285159 A1* | 10/2018 | Shen | G06F 12/126 |
| 2019/0235902 A1* | 8/2019 | Wei | G06F 9/45558 |
| 2020/0097297 A1 | 3/2020 | Behera et al. | |

* cited by examiner

PERFORMING RESYNCHRONIZATION JOBS IN A DISTRIBUTED STORAGE SYSTEM BASED ON A PARALLELISM POLICY

CROSS-REFERENCE TO RELATED APPLICATION

This application is a continuation of U.S. patent application Ser. No. 16/504,204, filed Jul. 5, 2019, entitled "PERFORMING RESYNCHRONIZATION JOBS IN A DISTRIBUTED STORAGE SYSTEM BASED ON A PARALLELISM POLICY", the entirety of which is incorporated herein by reference.

BACKGROUND

In modern storage systems, such as object-based, hyper-converged infrastructure (HCI) systems, large quantities of data are stored in data objects, containers, or the like, and the data stored therein is distributed across a variety of distributed resources, such as disks and network sources. In some cases, data objects become out of synchronization with the system and/or transfers of data within the system. Resynchronization jobs restore objects' compliance level by bringing the stale components up to date. In most implementations, resynchronization jobs do not use concurrency control. Each resynchronization job merely writes missed input/output (I/O) operations one after another. This design is suboptimal for bandwidth utilization under any work-conserving I/O scheduler at least because it cannot efficiently use available bandwidth when only a few resynchronization jobs are active in the scheduler queue. Further, the resources of the system are under contention from other types of I/O operations and resynchronization jobs with one outstanding I/O task may not be finished in a timely manner, threatening data security in the system. This scenario is especially prominent during a storm of resynchronization jobs during operations that include transferring large quantities of data, such as when all of the virtual machines of a host device are shut down or migrated to other hosts so that the host device can be put into a maintenance mode. The last few lingering resynchronization jobs cannot compete with other types of I/O operations due to low numbers of outstanding I/O tasks, which may result in the data affected by the last few resyncing components to be destabilized.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
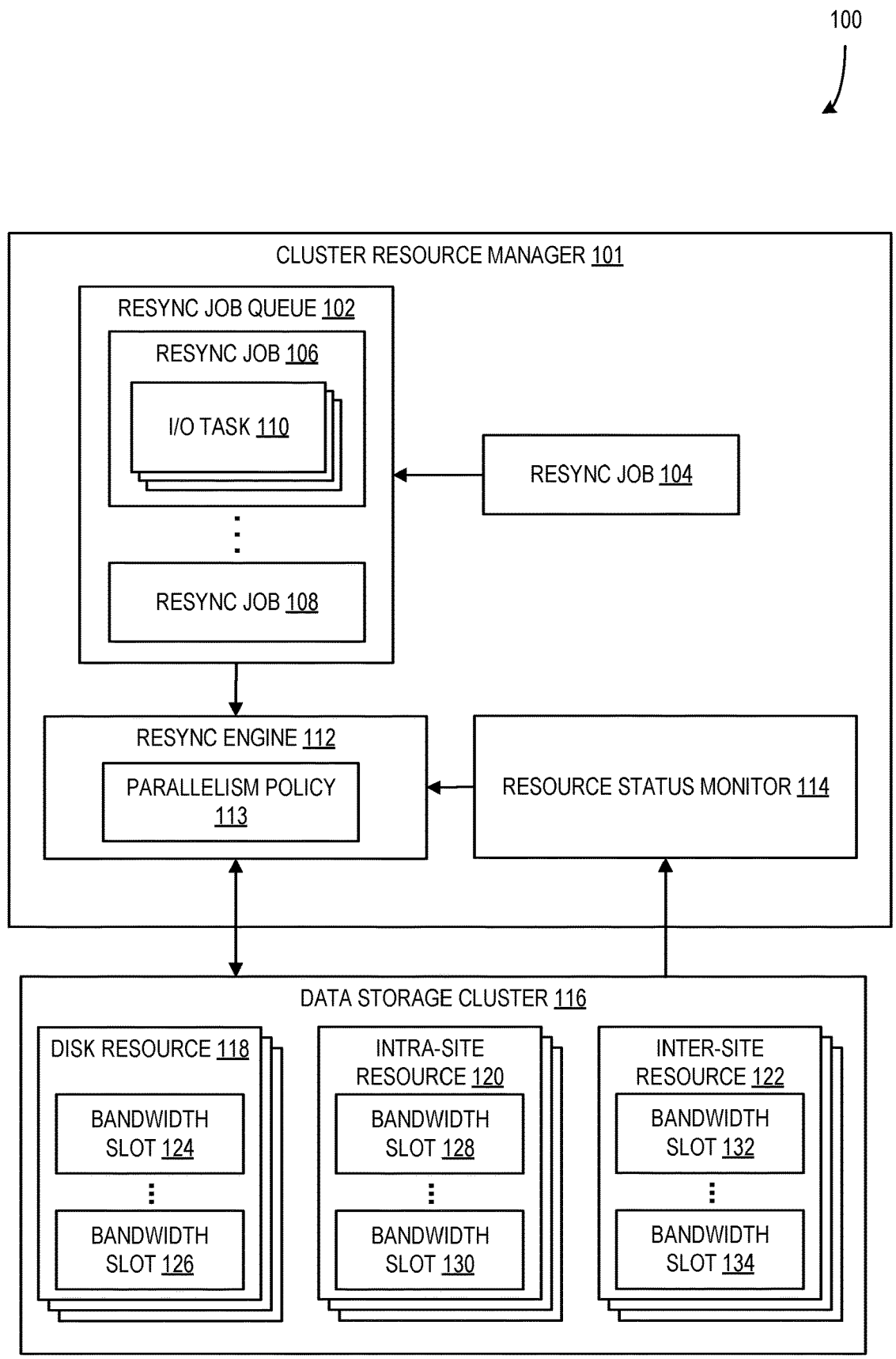
FIG. 1 is a block diagram illustrating a system configured for performing resynchronization jobs based on a parallelism policy according to an embodiment.

Aspects of the disclosure provide a computerized method and system for performing resync jobs in a distributed storage system based on a parallelism policy. A resynchronization ("resync") job is obtained from a resync job queue that contains pending resync jobs. Input/output (I/O) resources of the distributed storage system that will be used by the obtained resync job are identified and the available bandwidth slots of each of the I/O resources are determined. The parallelism policy is applied to the I/O resources and the associated available bandwidth slots.

The parallelism policy defines how the resource data is used to identify a bottleneck resource of the resync job, which is the resource most likely to limit the bandwidth usage of the resync job, and to calculate a parallel I/O value of the resync job, which is a value that indicates a quantity of I/O tasks that can be performed in parallel during execution of the resync job based on the parallelism policy. Based on the application of the parallelism policy, a bottleneck resource of the resync job is determined and a parallel I/O value of the resync job is calculated. The resync job is then executed using the I/O resources. The execution of the resync job includes performance of a quantity of I/O tasks in parallel based on the calculated I/O value. As a result, the bandwidth of the I/O resources is used efficiently and a rate with which the resync job is executed is increased.

The disclosure handles the staging and execution of resync jobs in a distributed storage system that occur as a result of detected errors, performance of maintenance operations, rebalancing of the data storage, and/or the like. The disclosure operates in an unconventional way by staging the resync jobs in a queue to ensure that each resync job is eventually executed and, when the resync jobs are executed, a quantity of abstract bandwidth slots are assigned to each job (e.g., abstract bandwidth slots are defined fractions or portions of available bandwidth of various resources in the system that, in most cases, each include sufficient bandwidth to accommodate individual I/O tasks of a resync job), enabling the system to perform I/O tasks of the resync job in parallel while, at the same time, preventing such parallelism from overloading the available bandwidth of I/O resources of the system which may negatively affect the performance of other I/O operations that are also making use of the I/O resources.

The identification of a bottleneck resource for each specific resync job and assignment of bandwidth slots based on the available bandwidth of the bottleneck resource prevents resync jobs from occupying the bandwidth of other resources that they cannot fully use due to limitations of the bottleneck resource. Further, during execution of a resync job, the assigned bandwidth resources of the resync job are dynamically adjusted based on the changing state of the I/O resources of the system, enabling the resync job to claim additional bandwidth slots when they become available and/or reduce the quantity of assigned bandwidth slots to make additional room for other I/O operations when the I/O resources become more contested. The disclosure enables the completion of resync jobs in an efficient and, in many cases, reduced amount of time, while preventing the execution of resync jobs from negatively affecting the performance of other types of I/O operations and traffic.

FIG. 1 is a block diagram illustrating a system 100 configured for performing resync jobs (e.g., resync jobs 104, 106-108) based on a parallelism policy 113 according to an embodiment. The system 100 includes a cluster resource manager 101 and a data storage cluster 116 configured to work in conjunction to manage and/or maintain data objects over a variety of hardware, firmware, and/or software components as described herein.

The cluster resource manager 101 includes hardware, firmware, and/or software configured to manage and perform resync jobs, including receiving resync jobs (e.g., resync job 104) from other components of the system, staging the resync jobs (e.g., resync jobs 106-108) in the resync job queue 102, and performing the staged resync jobs on the data storage cluster 116 using the resync engine 112 and based on the parallelism policy 113 as described herein. In some examples, the cluster resource manager 101 is executed on a computing device or devices (e.g., a server device, personal computer, laptop, tablet, mobile computing device) configured for executing software programs and interacting with the data storage cluster 116. Such interactions may include issuing input/output (I/O) requests to the cluster 116 to write data to distributed data stores using associated resources 118-122 and/or to retrieve data from such distributed data stores and associated resources. Further, in virtualization examples, the device or devices that host the cluster resource manager 101 are configured for executing guest systems, such as virtual computing instances (VCIs) (e.g., virtual machines (VMs), containers, or other types of VCIs) and enabling such guest systems to make use of the cluster 116 and associated resources 118-122 for distributed data storage. Alternatively, or additionally, the cluster resource manager 101 and the system 100 are generally operable in non-virtualized implementations and/or environments without departing from the description herein.

The cluster resource manager 101 is configured for initiating, scheduling, or otherwise managing the resync jobs or operations associated with data stored by host devices and/or VCIs or other guest systems of the system 100. The cluster resource manager 101 includes a resync job queue 102 storing staged resync jobs 106-108 that are to be performed, a resync engine 112 configured for executing queued resync jobs, and a resource status monitor 114 configured for gathering and providing resource status and/or usage data from the resources 118-122 of the data storage cluster 116. In some examples, the cluster resource manager 101 is a "daemon" program and an instance of the manager 101 is run on each host device in the system 100. The cluster resource manager 101 is configured to send instructions to the data storage cluster 116 with respect to resync jobs to be performed. Managing the performance of the resync jobs 106-108 also includes obtaining the current bandwidth usage of the cluster resources 118-122 and determining how to perform the I/O tasks (e.g., I/O task 110) of a resync job in parallel based on the parallelism policy 113 and the available bandwidth slots (e.g., bandwidth slots 124-134) of each resource 118-122 of the data storage cluster 116.

The resync job queue 102 of the cluster resource manager 101 includes hardware, firmware, and/or software configured to temporarily store and/or stage the resync jobs 106-108 that are to be performed and/or data associated with the resync jobs 106-108. After being received at the resync job queue 102 (e.g., resync job 104 being sent to the queue 102 as illustrated), the resync jobs 106-108 may be stored in the queue 102 until they are initiated and/or performed on the cluster 116, at which point the cluster resource manager 101 is configured to remove the initiated and/or performed resync jobs from the queue 102. In some examples, the queue 102 is a "first in, first out" (FIFO) structure, such that, as requested or proposed resync jobs arrive at the cluster resource manager 101, they are added to the "back" of the queue 102 and when the cluster resource manager 101 accesses a resync job 106 from the queue 102 to determine whether to initiate it, the manager 101 accesses the resync job 106 from the "front" of the queue 102, such that the operation that has been in the queue 102 the longest is the next operation to be accessed. Alternatively, the queue 102 may be configured to operate according to other data structure principles without departing from the description herein.

The resync jobs 104-108 are operations that are automatically generated by a host device or other component of the system 100 for management of the data stored in the data storage cluster 116 that is associated with hosted guest systems and/or other applications of the system 100. The resync jobs 106-108 are configured to resynchronize data in distributed data stores of the data storage cluster 116 using the resources 118-122, which may include copying data from one data location to another and then releasing the storage space at the original data location. These operations may be performed for a variety of purposes, including to repair errors in the data storage cluster 116, to make space in particular data locations to enable maintenance tasks, to rebalance the way data is stored within the cluster 116 and/or within particular distributed data stores, and/or to account for changes to configuration settings of the cluster 116. In some examples, resync jobs 104-108 are performed to restore compliance of data objects in the cluster 116 with data storage policies by bringing stale components of those objects up to date. Resync jobs may also be generated and/or initiated due to other events and/or manually by user-provided instruction in the system 100 without departing from the description herein.

Each resync job 106-108 includes data indicating how the resync job is to be performed, including current data location or locations, a location or locations to which the data is to be moved, and resources and/or types of resources to use to complete the resync job. Further, each resync job 106-108 includes a plurality of specific I/O tasks (e.g., I/O task 110 of resync job 106). Each I/O task 110 of a resync job defines a specific use of I/O resources during the resync job, such as copying, transferring, and/or storing a specific set or structure of data. In some examples, the I/O tasks 110 of a resync job 106 are configured to be substantially the same "size", or to otherwise consume the same or a similar quantity of bandwidth during performance. Dividing a resync job into consistently sized I/O tasks 110 enables efficient, effective implementation of the parallelism policy 113 when executing the resync job, as described herein.

In some examples, resync jobs 106-108 further include priority values that are used during performance of the resync jobs to determine how to assign bandwidth slots to the resync jobs or otherwise reserve bandwidth slots for the resync jobs, as described below. The priority values of resync jobs 106-108 may be assigned based on a type or category of the individual resync jobs (e.g., a resync job created to fix an error in the system may have a higher priority than a resync job created to rebalance the use of resources in the system). Alternatively, or additionally, priority values of resync jobs may be based on a length of time the resync jobs have been queued and/or other factors that affect the urgency to perform the individual resync jobs.

The resync engine 112 includes hardware, firmware, and/or software configured to process and execute resync jobs 106-108, including performing I/O tasks 110 of the resync jobs in parallel based on the parallelism policy 113 and the resource status data gathered by the resource status monitor 114. The behavior and operations of the resync engine 112 are described in greater detail below with respect to FIG. 2, but, more generally, the resync engine 112 executes resync jobs from the resync job queue 102 according to the processes, rules, and/or other portions of the parallelism policy 113.

The parallelism policy 113 is defined to guide the operations of the resync engine. In some examples, the parallelism policy 113 includes rules and/or processes for identifying resources (e.g., resources 118-122) to be used by a resync job and determining a "bottleneck resource" of the identified resources. A bottleneck resource is the resource of the identified resources that has the smallest quantity of available bandwidth that can be used by the resync job during execution or, alternatively, the resource of the identified resources that is most likely to limit the rate at which the I/O tasks of the resync job are performed based on available bandwidth. In non-proxy resync jobs (e.g., jobs within a single site), the bottleneck resource may be a disk resource 118 or an intra-site resource 120, while in proxy resync jobs (e.g., jobs between multiple sites), the bottleneck resource may be a disk resource, 118, an intra-site resource 120, or an inter-site resource 122.

For instance, in an example where the proxy resync job being executed will use the disk resource 118, the intra-site resource 120, and the inter-site resource 122, the available bandwidth of the disk resource 118 is often abundant and the available bandwidth of the intra-site resource 120 is generally abundant, while the available bandwidth of the inter-site resource 122 is generally scarce. In such a situation, the resync engine 112 may identify the inter-site resource 122 as the bottleneck resource for the resync job. Alternatively, if the available bandwidth of the disk resource 118 is found to be less than the available bandwidth of the inter-site resource 122 based on bandwidth data collected by the resource status monitor 114, the disk resource 118 may be identified as the bottleneck resource.

Further, in some examples, the parallelism policy 113 includes rules and/or processes for logically dividing available bandwidth of the resources 118-122 into bandwidth slots (e.g., bandwidth slots 124-134) and assigning those bandwidth slots to resync jobs for use in performing I/O tasks of the resync jobs in parallel. In some cases, there is no precise telemetry of a single bandwidth slot's resource usage for a specific resource type and, as a result, the definition of the bandwidth slots of each resource are predetermined and specific to the resource itself (e.g., a bandwidth slot total of disk resource 118 is defined to be 50 slots). The predetermined value may be based on an amount of bandwidth used by some or most I/O tasks 110 of resync jobs 106-108. For instance, the value may be based on the average bandwidth of the resource used by an I/O task 110 or based on a value greater than the bandwidth used by a percentage of I/O tasks (e.g., a value that exceeds the bandwidth used by 75% or 95% of the I/O tasks).

While the number of bandwidth slots and/or capacity of each bandwidth slot of the resources 118-122 may differ between each type of resource and/or each specific resource, in some examples, the relative capacity of the bandwidth slots of each resource are defined such that the performance of an I/O task 110 of a resync job that uses the resource can be accommodated by bandwidth capacity of a single bandwidth slot for most I/O tasks 110. For instance, if I/O tasks 110 tend to use less than 10 Mbps of disk resource bandwidth and 12 Mbps of intra-site resource bandwidth, the bandwidth slot (e.g., bandwidth slots 124-126) of the disk resource 118 may be defined as 10 Mbps in capacity and the bandwidth slot (e.g., bandwidth slots 128-130) of the intra-site resource 120 may be defined as 12 Mbps in capacity. While they are different slot capacities, one bandwidth slot of each of the disk resource 118 and the intra-site resource 120 is sufficient to perform an I/O task that uses both resources.

While the bandwidth slots 124-134 are illustrated as part of the resources 118-122, it should be understood that, in some examples, the slots 124-134 are logical divisions that are established and used by the resync engine 112 and/or other components of the cluster resource manager 101, rather than being represented within the actual resources 118-122 themselves. For instance, the resource status monitor 114 collects bandwidth data from the disk resource 118 indicating a total available bandwidth capacity of the resource 118 and, upon receiving the collected bandwidth data, the resync engine 112 divides the available bandwidth into the bandwidth slots 124-126 for assignment to or reservation for resync jobs. In this case, the disk resource 118 itself does not include information defining the division of the available bandwidth into the slots 124-126. Alternatively, or additionally, the data storage cluster 116 and/or one or more of the resources 118-122 may include indicators or other information associated with dividing available bandwidth into bandwidth slots that may be accessed by the resource status monitor 114 and/or the resync engine 112.

In further examples, the parallelism policy 113 is configured to include rules and/or processes to guide the resync engine 112 in performing the I/O tasks 110 of resync jobs in parallel based on the quantity of bandwidth slots that are assigned to the resync jobs. For instance, a resync job is assigned three bandwidth slots of the inter-site resource 122 bandwidth slots 132-134 and, as a result, the resync engine 112 performs three I/O tasks 110 of the resync job in parallel using the three assigned bandwidth slots in accordance with the parallelism policy 113. The assignment of bandwidth slots to resync jobs is described further below with respect to FIG. 2.

In some examples, the resync engine 112 includes an admission control component that is configured to guarantee that resync jobs admitted to the queue are assigned at least one slot of the available resources (e.g., at least one bandwidth slot may be reserved for each resync job as they are accessed from the queue). The admission control component enables all resync jobs to run with at least one bandwidth slot, rather than being assigned a fraction of a slot.

The resource status monitor 114 includes hardware, firmware, and/or software configured to collect or otherwise access bandwidth data and/or other status data of the resources 118-122 on the data storage cluster 116. In some examples, the resource status monitor 114 periodically polls each resource 118-122 of the data storage cluster 116 to gather bandwidth data, including data indicating current available bandwidth, current used bandwidth, and/or total bandwidth of each resource. The resource status monitor 114 may access the data via one or more application program interfaces (APIs) of the data storage cluster 116 and/or the specific resources 118-122. Further, the resource status monitor 114 provides access to the collected bandwidth data and/or other status data associated with the resources to the resync engine 112. In some examples, the bandwidth data is provided to the resync engine 112 periodically based on when the monitor collects the data from the data storage cluster 116, such that the resync engine 112 receives up-to-date bandwidth data associated with the resources 118-122 during the described resync job execution operations described herein.

The data storage cluster 116 includes hardware, firmware, and/or software configured to enable access and interactions with the resources 118-122 and data objects that make use of those resources by the host devices or other computing devices. In some examples, the cluster 116 is configured to include interfaces that enable the storage of data associated with guest systems or other software applications being executed on the host devices in data objects according to distributed data storage principles, including storing files and/or data structures across multiple data stores, storing files and/or data structures redundantly on multiple data stores, accessing stored data on multiple data stores in parallel processes, etc. Further, I/O requests associated with background processes for managing and/or maintaining the data storage cluster 116, such as resynchronization operations, or "resync" operations (e.g., resync jobs 104, 106-108), are enabled via interfaces of the data storage cluster 116.

The resources 118-122 of the data storage cluster 116 include hardware, firmware, and/or software configured to enable storage, access, and transfer of data as described herein. The disk resources 118 include physical hard drive devices, firmware and/or software disk interfaces, virtualized disks, and/or other components of the data storage cluster 116 associated with storage of data on disks or the like. In some examples, performing a resync job includes transferring data from one disk resource to another disk resource in the data storage cluster and, in such cases, the bandwidth data of both disk resources are used to determine how the resync job is performed (e.g., how many bandwidth slots are assigned to the resync job based on the parallelism policy as described herein). In further examples, resync jobs are configured to use evenly distributed I/O bandwidth, such that the bandwidth slots (e.g., bandwidth slots 124-126) of a disk resource are divided evenly (e.g., each bandwidth slot of 50 total bandwidth slots 124-126 can be used by a single I/O task 110). It should be understood that, in some cases, it is assumed that resync jobs are distributed across all disk resources and that all resync jobs are evenly distributed across all host devices of the system, such that disk resource usage by the resync jobs can be accurately estimated based on those assumptions. Alternatively, such an assumption may not hold in all cases. In some examples, an intelligent method is used to capture skewed distributions of network/disk usage. For example, if the destinations of one or more resync jobs are concentrated on a certain disk, then assuming each job will use $\frac{1}{50}^{th}$ of the disk's service capability may not be accurate for that disk. Instead, the disk with more concentrated use may be treated similarly to a cluster with a smaller number of available disks (e.g., the cluster may have fewer total disk bandwidth slots to assign). This may also be used with network resources such as intra-site resources 120 and inter-site resources 122. In such skewed cases, an intelligent component of the resource status monitor 114 or other component of the system is configured to detect such skewed usage of resources may cause I/O tasks to avoid such congested paths and/or may use the detected skewed usage to make more accurate estimations of slot usage for each resync job. With a reduced number of available resources due to congestion, the pending queue of resync jobs may grow because of the congestion, and the parallelism used by the resync engine 112 may be reduced or disabled until the congested resource or resources become less contended.

The intra-site resources 120 and inter-site resources 122 are network resources that include physical network infrastructure (e.g., switches, routing devices, or the like), firmware and/or software networking layers and/or interfaces, and/or other components of the data storage cluster 116 associated with communicating and/or transferring data between components by a network. Intra-site resources 120 include resources associated with network communications within specific sites of the data storage cluster 116 and inter-site resources 122 include resources associated with network communications between different sites of the data storage cluster 116. It should be understood that intra-site resources 120 and inter-site resources 122 may include similar types of resources, but they are illustrated separately to illustrate the relatively significant difference in the availability of bandwidth between both resource types (e.g., intra-site resources typically have abundant bandwidth, while inter-site resources typically have more scarce bandwidth). The difference between the available bandwidth of the intra-site resources 120 and the inter-site resources 122 may be based on differences in number of jumps data has to make (e.g., inter-site data transfer may require significantly more transfers between components) and/or more or different levels of data processing before, during, or after the data transfer. Other differences between the two resource types may also affect the relative differences in bandwidth availability, as would be understood by a person of ordinary skill in the art. Alternatively, or additionally, more, fewer, or different types of resources may be used in similar systems without departing from the description herein.

In an example, a resync job includes transferring data of a data object from a first disk resource to a second disk resource at a different site via two intra-site resources and one inter-site resource. In such a case, each disk resource, each intra-site resource, and the inter-site resource are all analyzed based on the associated bandwidth data provided by the resource status monitor 114 to identify a bottleneck resource. Once identified, the available bandwidth of the bottleneck resource is used to determine a quantity or number of bandwidth slots to be assigned to the resync job. This process is described in further detail below with respect to FIG. 2.

Figure 2:
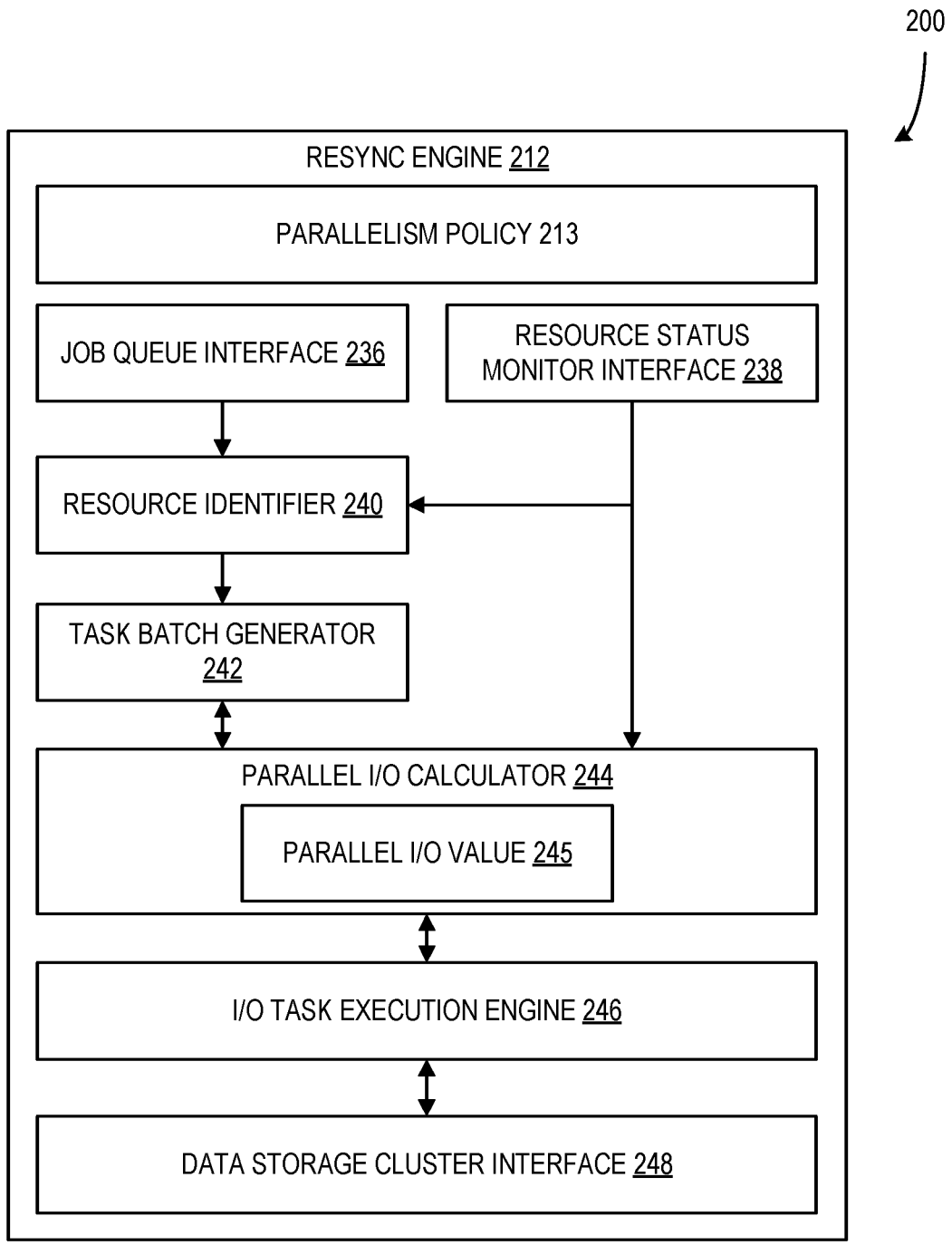
FIG. 2 is a block diagram illustrating a resynchronization engine configured to perform tasks of resynchronization jobs in parallel according to an embodiment.

FIG. 2 is a block diagram 200 illustrating a resync engine 212 configured to perform tasks of resync jobs in parallel according to an embodiment. The resync engine 212 includes a parallelism policy 213 and interfaces 236, 238, and 248 for communicating with the resync job queue (e.g., resync job queue 102), resource status monitor (e.g., resource status monitor 114), and data storage cluster (e.g., data storage cluster 116) respectively. Further, the resync engine 212 includes a resource identifier 240, a task batch generator 242, a parallel I/O calculator 244, and an I/O task execution engine 246. As described above, the parallelism policy 213 of the resync engine 212 guides the resync engine 212 and some or all of the components thereof in the parallel performance of I/O tasks of resync jobs as described herein.

The job queue interface 236 is configured to enable the resync engine 212 and components thereof to communicate with an associated resync job queue, such as resync job queue 102, as described above. In some examples, the job queue interface 236 is used to obtain or otherwise receive resync jobs and/or data associated with resync jobs from a resync job queue and provide the received job and/or data to the resource identifier 240 and/or other components of the resync engine 212. The resync engine 212 may be configured to send a request for a resync job via the job queue interface 236 when the resync engine 212 is ready to perform the job. Alternatively, or additionally, the job queue interface 236 may be used to receive resync jobs from the resync job queue periodically or otherwise according to a pattern. In further examples, the job queue interface 236 is an application programming interface (API) that is configured to be compatible with the resync job queue with which the resync engine 212 interacts.

Similarly, the resource status monitor interface 238 is configured to enable the resync engine 212 and components thereof to communicate with an associated resource status monitor, such as resource status monitor 114, as described above, including to obtain or otherwise receive resource status data, such as bandwidth data, from the resource status monitor. In some examples, the resource status monitor interface 238 is configured to request resource status data from the resource status monitor periodically and/or based on defined events, such as receiving a new resync job from the resync job queue or preparing to execute a batch of I/O tasks of a resync job. Alternatively, or additionally, the resource status monitor interface 238 may include an exposed interface that enables resource status monitors to provide up-to-date resource status data directly to the resync engine. Similar to the job queue interface 236, the resource status monitor interface 238 may include an API that is configured to be compatible with the resource status monitor with which the resync engine 212 interacts.

The data storage cluster interface 248 is configured to enable the resync engine 212 and components thereof to communicate with the data storage cluster, such as data storage cluster 116, as described above, and resources thereof, such as resources 118-122, as described above. In some examples, the data storage cluster interface 248 is used by the I/O task execution engine 246 and/or other components of the resync engine 212 to send instructions regarding the performance of I/O tasks to the data storage cluster, such that those I/O tasks are performed. Such instructions may include identification of data to be transferred or moved, current location of data to be moved, destination location of data to be moved, and identification of resources to be used during the transfer of the data. In further examples, the data storage cluster interface 248 is used to receive data from the data storage cluster, such as status information associated with I/O tasks that are being performed. The data storage cluster interface 248 may be configured as an API enabling communication between the resync engine 212 and data storage cluster as described herein.

The resource identifier 240 is configured to receive a resync job (e.g., resync jobs 106-108) and/or data associated therewith and identify resources (e.g., resources 118-122) of the data storage cluster to be used during performance of the resync job. In some examples, the resource identifier 240 accesses information about the structure of the resources of the data storage cluster (e.g., the way in which resources of the cluster connect and/or communicate) and the data of the resync job indicating the data locations between which data will be transferred during performance of the resync job. The structure of the resources of the data storage cluster may be obtained or provided from the resource status monitor and/or the data storage cluster directly. The resource identifier 240 is configured to determine an "I/O path" from the source location (or locations) to the destination location (or locations) of the data to be transferred during the resync job, wherein the determined I/O path traces the transfer of data from the source location(s) to the destination location(s) in terms of cluster resources that are used. For instance, transferring data from a first location to a second location may result in an I/O path that includes the disk resource associated with the first location, an intra-site network resource used to transfer the data to a network resource on the edge of the site, a couple of inter-site network resources used to transfer the data from the site of the first location to the site of the second location, another intra-site network resource to transfer the data to the disk resource of the second location within the site, and the disk resource of the second location itself. The resources identified in the I/O path are used by other components of the resync engine 212 during performance of the resync job as described herein.

In some examples, more than one possible I/O path may be identified by the resource identifier 240. In such a case, the resource identifier 240 is configured to select an I/O path according to defined path selection rules, which may include, for instance, selecting the I/O path that includes the fewest resources (e.g., the most direct path), selecting the I/O path that includes the fewest resources of a particular type (e.g., the path that best avoids inter-site resources), or selecting the I/O path that includes high-performing resources (e.g., the path that prioritizes resources that perform efficiently). Alternatively, or additionally, current available bandwidth data from the resource status monitor interface 238 may be used to select the I/O path with the highest available bandwidth of a bottleneck resource (e.g., prioritizing the ability to perform I/O tasks of the resync job in parallel, as described herein). Other methods of selecting an I/O path from multiple possible I/O paths may be used without departing from the description herein.

The task batch generator 242 is configured to receive the I/O tasks (e.g., I/O tasks 110) of a resync job to be performed and divide the tasks into batches tor parallel execution as described herein. In some examples, the task batch generator 242 divides the I/O tasks into batches of consistent numbers of tasks based on a defined batch size value in the parallelism policy 213 (e.g., the parallelism policy 213 includes a defined batch size value of ten and the task batch generator 242 divides 50 I/O tasks of a resync job into five groups of ten I/O tasks). Alternatively, the size of the task batches may be based on a fraction or percentage of total tasks or based on other defined values associated with the resync job.

In other examples, the task batch size of each task batch associated with a resync job may be defined dynamically during the performance of the resync job. For instance, during performance a resync job, after the parallel I/O calculator 244 determines a number of I/O tasks that can be performed in parallel, or a parallel I/O value (e.g., a parallel I/O value 245), as described below, the task batch generator 242 may generate a task batch that is the size of the parallel I/O value or a multiple of the parallel I/O value (e.g., if a parallel I/O value of 5 is determined, the task batch size may be set at 5, 10, 15, 20, etc.). Such a dynamic task batch size may be determined once for a resync job prior to execution of the first batch of tasks. Alternatively, or additionally, a new parallel I/O value 245 may be calculated between each task batch of the resync job and the size of the next task batch may be defined based on the most recently calculated parallel I/O value 245.

The parallel I/O calculator 244 is configured to receive data associated with the resync job to be performed and available bandwidth data associated with the resources of the data storage cluster to determine a current parallel I/O value 245 of the resync job. The parallel I/O value 245 is a quantity of I/O tasks that can be performed in parallel for the resync job based on the available bandwidth of the bottleneck resource to be used by the resync job. In some examples, determination of a current parallel I/O value 245 includes analysis of the resources identified by the resource identifier 240 and the current available bandwidths of those resources as provided via the resource status monitor interface 238.

In some examples, the parallel I/O calculator 244 is configured to determine a bottleneck resource for the resync job based on the identified resources and the available bandwidth data of those resources. For instance, based on a set of four identified resources for a resync job, the calculator 244 determines that the available bandwidth slots for the four identified resources are 20, 30, 30, and 40, respectively. Because the first resource has 20 available bandwidth slots and the other resources all have more, the first resource may be determined to be the bottleneck resource. However, in alternative examples, other factors, such as a priority value of the resync job, may be analyzed when determining the bottleneck resource.

After determining the bottleneck resource of the resync job, the parallel I/O calculator 244 is configured to determine a parallel I/O value 245 of the resync job based on the available bandwidth capacity and/or bandwidth slots of the bottleneck resource. In some examples, the number of available bandwidth slots of the bottleneck resource has been calculated and the bandwidth slots of the bottleneck resource are configured to enable the performance of one I/O task each. In such examples, the parallel I/O value of the resync job may be set to the number of available bandwidth slots of the bottleneck resource directly. Alternatively, if the available bandwidth capacity of the bottleneck resource has been determined but the number of available bandwidth slots has not been determined, the calculator 244 may be configured to divide the available bandwidth capacity of the bottleneck resource by the bandwidth required for performing an I/O task of the resync job to obtain a parallel I/O value 245. As previously mentioned, other factors, such as priority of the resync job with respect to resources that are used by multiple jobs, may further affect the calculation of the parallel I/O value 245.

In an example, the determination of the bottleneck resource and an associated parallel I/O value 245 is based on a combined analysis of a priority value of the resync job, the cluster resources required for the resync job, and the current availability of bandwidth of the cluster resources. Such an analysis may be defined by and/or guided by the rules and/or processes of the parallelism policy 213. The priority value of the resync job is evaluated in relation to the priorities of other jobs on the system that are using the same resources. In the example system, a set of jobs $(j_1, j_2, \ldots j_m)$ are being performed using various resources of the cluster. For a job $j_k$, a set of resources $R_k$: $(r_1, r_2, \ldots r_n)$ of resource types $T_k$: $(t_1, t_2, \ldots t_n)$ is used to perform I/O tasks of the job (e.g., the resources of the identified I/O path described above). The availability of the resources in the cluster is represented as $A_k$: $(a_1, a_2, \ldots a_n)$ (e.g., the bandwidth slots of the resources of the cluster). Further, the priority of a job $j_k$ is $p_k$. The overall priority value $(P_i)$ of a resource $r_i$ is represented as the sum of priority values of all jobs that use $r_i$.

In some examples, the bottleneck resource of a job $j_k$ is the resource $r_i$ from the resources $r_i$-$r_n$ with the lowest result from evaluating the following expression defined in the parallelism policy 213: $(p_k/P_i)*(a_i/r_i)$. The expression includes the ratio of the priority of the resync job being analyzed to the overall priority value of the resource being evaluated multiplied by the ratio of the available bandwidth of the resource being evaluated to the bandwidth of the resource to be used by the job being analyzed. The second ratio results in a value that is the number of I/O tasks of the resync job that can be performed in parallel on the resource being evaluated (e.g., a resource has 10 Mbps available bandwidth and the resync job requires 2 Mbps per I/O task, so the second ratio is five, indicating that five I/O tasks of the resync job may be performed in parallel). The first ratio adjusts the number of parallel I/O tasks of the resync job that can be performed using the resource based on the ratio of the priority of the resync job to the overall priority value of the resource, such that a job that has a lower priority relative to the overall priority value of the resource has a more substantially reduced number of potential parallel I/O tasks compared to a job that has a higher priority value. For instance, a first job has a priority value of ten, a second job has priority value of six, and a third job has a priority value of four. All three jobs use a particular resource during performance. In determining the bottleneck resource for the first job, the first ratio of the expression for the first job is equal to 0.5 (i.e., 10/(10+6+4)), such that, if the second ratio indicates that the resource has bandwidth sufficient for eight parallel I/O tasks of the first job, the result of the expression for the first job is four (i.e., 0.5*8). If four is the lowest result of the expression for all resources used by the first job, then the resource is the bottleneck resource of the first job. Further, for the second job, the first ratio of the expression is 0.3 (i.e., 6/(10+6+4)) and, if the second ratio of the second job indicates that the resource has bandwidth sufficient for ten parallel I/O tasks of the second job, the result of the expression for the third job is three (i.e., 0.3*10). For the third job, the first ratio of the expression is 0.2 (i.e., 4/(10+6+4)) and, if the second ratio of the third job indicates that the resource has bandwidth sufficient for five parallel I/O tasks of the third job, the result of the expression for the third job is one (i.e., 0.2*5).

It should be understood that, in some cases, the expression described above does not evaluate to a whole number. In those cases, evaluation of the expression may include rounding down to the nearest whole number after evaluation of the multiplication of both ratios, resulting in the number of parallel I/O tasks that can be performed using the resource without exceeding result of the expression. In some examples, if such rounding down results in sufficient unused bandwidth of the resource, the calculator 244 is configured to assign the unused bandwidth to one or more of the jobs using the resource based on priority value and/or other factors.

In further examples, the parallelism policy 213 and/or the calculator 244 are configured to enforce limits on the calculation of the parallel I/O value 245 for a resync job. For instance, a minimum limit on the parallel I/O value 245 may be set to one, such that all resync jobs are assigned at least one bandwidth slot for performance of I/O tasks. Further, a maximum limit may be set, such that no resync job is assigned more bandwidth slots than the maximum limit (e.g., a maximum limit of 10, 20, or 30 slots). These limits may be enforced by first calculating the parallel I/O value 245 as described above and then comparing the calculated value to the limits. If the calculated value exceeds the maximum limit or is less than the minimum limit, the parallel I/O value 245 is set at the maximum limit or minimum limit respectively.

In another example where the proxy resync job has to issue operations using an inter-site wide area network (WAN) link with I/O payloads, it will consider two types of network resources when determining a bottleneck resource: a point-to-point 10 Gbps switch and a 100 Mbps inter-site WAN link ({t_net1, t_net2, t_disk}, assuming disk bandwidth is symmetric). The WAN link is identified as a bottleneck resource. The system determines assigned bandwidth slots in such a way as to avoid overloading the bottlenecked resource (WAN link), and it assumes that a_i==r_i pessimistically, always leading to a parallelism of 1. Alternatively, the system is enhanced to include to limits and reservations of bandwidth slots, enhancing its capabilities to meet the needs of new types of resync jobs. Note that even if inter-site WAN link is a powerful 10 Gbps link, it is still much more contended by other I/O traffic than intra-site resources: intra-site 10 Gbps links are point-to-point 10 Gbps.

The I/O task execution engine 246 is configured to receive the task batches of I/O tasks of a resync job and the parallel I/O value 245 associated with the resync job or the specific task batch, and to interact with the data storage cluster via the data storage cluster interface 248 to perform the I/O tasks of the received task batch using the identified resources of the data storage cluster. In some examples, the engine 246 uses the calculated parallel I/O value 245 to determine how to parallelize the performance of the I/O tasks in the received task batch.

Further, the I/O task execution engine 246 is configured to send instructions to the data storage cluster interface 248 that include data associated with the I/O tasks of the task batch to be performed and the parallel I/O value 245, which is used during the performance of the task batch to guide the parallelization of the performance of the tasks on the cluster based on the determined bottleneck resource of the I/O tasks. It should be understood that, in some examples, the parallel I/O value 245 is used to determine a precise number of bandwidth slots that are used to perform the I/O tasks of the task batch. However, in many cases, strict enforcement of the parallel I/O value 245 results in inefficient use of cluster resources, and so, in alternative examples, the execution engine 246 and/or components of the cluster used to perform I/O tasks (e.g., a cluster-based task scheduler or the like) are configured to use the parallel I/O value 245 as a guiding value and allow for some transitory overload or underload of bandwidth slot assignments (e.g., some resync jobs may be assigned more slots than they can effectively use, while other resync jobs may be able to efficiently use more slots than they are assigned based on rapidly changing use of resources).

In some examples, the performance of a resync job by the I/O task execution engine 246 in combination with other components such as the task batch generator 242 and the parallel I/O calculator 244 includes a loop of performing task batches, with each task batch performance including three stages: a preparation stage, an execution stage, and a finalizing stage. The preparation and finalizing stages are performed serially on the I/O tasks of the resync job and/or specific task batch, while the execution stage makes use of the parallelism techniques described herein to perform the tasks in parallel as defined in the parallelism policy 213. Preparation includes the calculation of a parallel I/O value and generation of a task batch based on up-to-date resource status and/or bandwidth data from the resource status monitor prior to each task batch being executed. The execution stage includes the performance of the I/O tasks on the cluster, with some or all of the I/O tasks being performed in parallel based on the parallel I/O value 245 as described herein. The finalizing stage includes updating the resource usage information based on the completion of the I/O tasks during the execution stage (e.g., the resources used to perform the completed tasks are now freed for use with other tasks, so the available bandwidth data of those resources is updated). In some examples, the system is configured to use a push model, such that the finalizing stage includes pushing updated resource usage information to the execution engine 246, such that it can be used during other preparation stages. However, in alternative examples, a pull model may be used, wherein the execution engine 246 pulls the updated resource usage data from a data source prior to calculating parallel I/O values. These stages may be performed by the execution engine 246, other elements of the resync engine 212, and/or components of the data storage cluster in a manner that would be understood by a person of ordinary skill in the art.

In an example preparation phase, the resync engine 212 is configured to cache 64 extents (e.g., cached storage space), up to 2 GB in size each, for use by the next batch of tasks. The cache is filled by a single operation, and parallel I/O tasks are enabled to use as many entries of the extents as possible until the cached entries run out. As a result, the last I/O tasks or batch of I/O tasks may not be able to use all its entitled bandwidth slots. However, a new operation may be performed to cache more extent entries for use by the next batch of tasks after the batch which exhausts the cache.

In an example execution phase, transient errors are self-contained in the operation of the I/O tasks themselves because they are owner-based operations. Such operations are configured to retry forever until a permanent error occurs. If the associated resync job's lowest conflicting offset conflicts with other I/O operations, the current batch is configured to drop the I/O tasks that have surpassed a defined offset, preventing the I/O tasks in error from retrying continuously.

Based on the described loop, the complete performance of a resync job may include the performance of a plurality of task batches, and for each task batch, the state of the associated cluster resources may be reevaluated based on up-to-date resource status data, such that a fresh parallel I/O value 245 is calculated for each task batch, enabling the performance of each task batch to include parallel performance of I/O tasks and enhancing the efficiency of the use of the cluster resources involved. Alternatively, or additionally, updated resource status data may be received on a defined schedule, such that new parallel I/O values 245 are only calculated when updated resource status data is received. For instance, the resource status monitor may be configured to provide updated resource status data every 100 milliseconds (ms), 1 second, or on another interval. If multiple task batches are performed between such intervals, the most recently calculated parallel I/O value 245 may be used by each of the multiple task batches or the most recently received resource status data may be used to calculate a parallel I/O value 245 for each task batch of the multiple task batches.

In some examples, there is a chance of failure(s) in a task batch that will keep a number of bandwidth slots tagged as being in use. However, resync jobs performed by the resync engine 212 as described herein do not depend on such slots, but rather on the available bandwidth slots of resources and/or the number of other resync jobs using resources. For this reason, sometimes the total number of slots tagged as being in use will be greater than the limit of total bandwidth slots. This will not, however, cause any overload on the actual disks or other resources because the actual usage will be less than the officially tagged "in use" bandwidth slots. For instance, the system may include a retry mechanism that prevents failed I/O tasks from being retried too quickly. Further, only a small percentage of the I/O tasks will experience a "retry" in most cases. As a result, even if a failed batch's slots that are "stuck" (e.g., inaccurately flagged as "in use") are not removed from the total available bandwidth slots of the associated resources when determining parallel I/O values 245 for other resync jobs, the retries of the failed batch use only a nominal amount of resources within acceptable ranges.

The various types of failures described herein and/or other local failures may cause some resync jobs and/or associated task batches to not fully utilize a total amount of assigned bandwidth slots for a period of time. Such failures may also include congestion signals, causing an inability of the jobs or system to increase utilization. For example, performance of I/O tasks in parallel may be restricted not by disk device I/O bandwidth, but by internal resources such as log-structured object manager (LSOM) log processing speed or other types of component congestion. In some examples, the system includes a congestion mechanism that is configured to deal with local thrashing of internal resources per component, but the mechanism does not improve global cluster utilization since the occupied slots do not benefit the inefficient resync jobs. Further, the mechanism cannot be used by other resync jobs on the same host device that go to other target disks and/or components. In such a case, the resync engine 212 is configured to detect diminishing returns on the performance increase of resync jobs that are assigned groups of bandwidth slots for use in parallelizing I/O tasks as described herein. If the assigned quantity of bandwidth slots is higher than the resync job can receive a performance benefit from, the resync engine 212 and/or components therein are configured to reduce the parallel I/O value 245 of the resync job and/or associated task batches to a value that more efficiently uses the bandwidth slots of the cluster resources, freeing up bandwidth slots that the resync job has been assigned but of which the resync job is not taking full advantage.

In further examples, the resync engine 212 is configured to record the quantity of bandwidth slots of a resync job that are not being fully used and return those bandwidth slots to the pool of available bandwidth slots for use by other resync jobs. This process is called "slot donation". Analysis of whether bandwidth slots assigned to a resync job should be donated may be performed on a set schedule and, in some cases, it is done on a less frequent interval than "every task batch", as the cases where it is indicated are less common. Donation of bandwidth slots is anonymous, in that a bandwidth slot donated back to the pool of available bandwidth slots may be used by any other resync job. In fact, a resync job that is assigned a donated slot may also end up donating the slot back to the pool as well.

Bandwidth slots may be donated back to the pool for specific cluster resources. For instance, if a resync job is using bandwidth slots of most assigned resources fully, but inefficiently using bandwidth slots associated with a particular disk resource, some of the assigned bandwidth slots of that disk resource may be donated back to the pool of available bandwidth slots for that particular disk resource.

In some examples, the resync engine 212 or other components or modules of the system are configured to determine the actual use of bandwidth slots over a period of time. However, in other examples, "wasted" slots (e.g., bandwidth slots that are not being efficiently used and should be donated) are determined by a threshold of increase in bandwidth when the number of assigned bandwidth slots increase. For instance, if the extent of the actual bandwidth increase of the resync job is not within 80% of the bandwidth increase associated with increased assigned bandwidth slots for a defined period of time, a constraint value is applied to the number of bandwidth slots the resync job is assigned during the calculation of future parallel I/O values 245. Determining the constraint value is based on finding the "knee point" in a graph (e.g., a point after which the increase in bandwidth is reduced) of the actual bandwidth increase of the resync job versus the increase of the assigned number of bandwidth slots. The constraint value applied to the resync job limits the number of assigned bandwidth slots to the number of bandwidth slots associated with the identified knee point of the graph (e.g., the number of bandwidth slots that matches the knee point or the greatest whole number of assigned bandwidth slots before the knee point in the graph).

Slot donation improves the efficiency and granularity with which the bandwidth of cluster resources is managed and controlled, rather than congestion in particular parts of the system being smoothed or averaged over the performance of all of the components associated with a data object. Further, the slot donation process benefits the scheduling of I/O tasks on the cluster in case other types of I/O tasks (e.g., I/O from guest systems) being favored in the scheduler. The performance of resync jobs using slot donation and the other processes described herein are elastic enough to not push too hard on the scheduler component in most cases to cause a degradation in performance.

In some examples, increasing the assigned bandwidth slots of a resync job is attempted after a defined period of slot donation. Various methods of increasing and/or decreasing constraint values on resync jobs may be used without departing from the description herein (e.g., a defined increment adjustment ("fixed stride"), "exponential decay" adjustment, etc.). For instance, when decreasing a constraint value of a resync job after the defined donation period, the constraint value may be stepped down by a defined increment value and, when increasing a constraint value of a resync job to increase the quantity of donated slots, the constraint value may be stepped up based on an exponential decay-based value. A flow chart illustrating an exemplary slot donation feedback loop is provided in FIG. 5 and described below.

Figure 3:
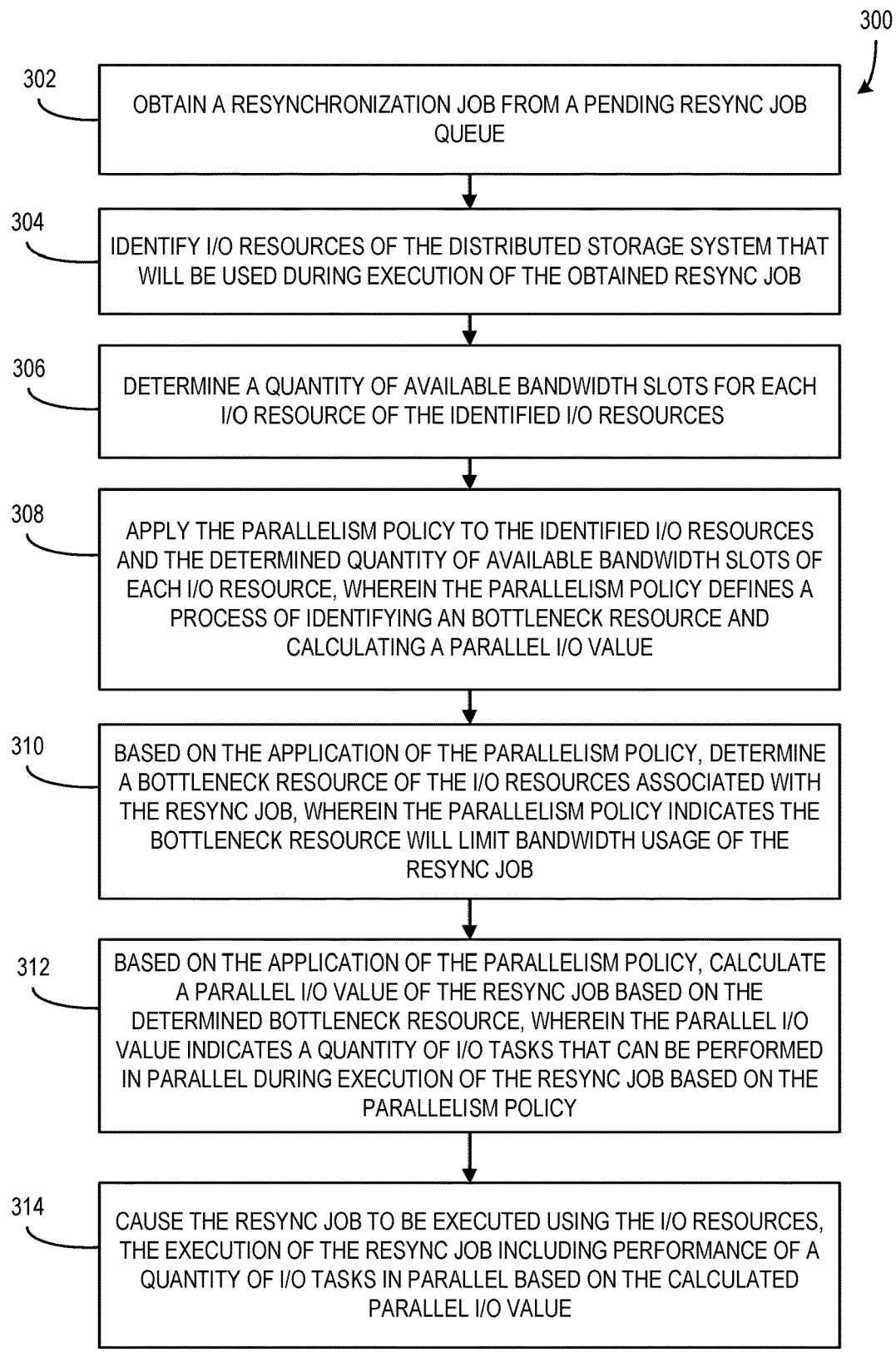
FIG. 3 is a flow chart illustrating a method of executing a resynchronization job based on a parallelism policy according to an embodiment.

FIG. 3 is a flow chart illustrating a method 300 of executing a resync job (e.g., resync jobs 106-108) based on a parallelism policy (e.g., parallelism policy 113) according to an embodiment. In some examples, the method 300 is performed by one or more components of a system such as system 100 of FIG. 1. At 302, a resync job (e.g., resync jobs 106-108) is obtained from a pending resync job queue (e.g., resync job queue 102). In some examples, the resync job obtained is the next resync job in a defined order of the resync job queue (e.g., FIFO-based order). Alternatively, the resync job obtained may be obtained based on a priority value associated with the resync job relative to other resync jobs in the queue (e.g., a resync job initiated to correct a detected error may have priority over a resync job initiated to rebalance data storage in the system).

At 304, one or more I/O resources (e.g., resources 118-122) of the distributed storage system (e.g., data storage cluster 116) that will be used during execution of the obtained resync job are identified. In some examples, the resync job includes information associated with current data location and a destination data location or locations, and the associated I/O resources are determined based on that location information and analysis of the state of the data storage cluster resources (e.g., identifying various available I/O paths between the locations). Alternatively, or additionally, the resync job may include information identifying specific I/O resources to be used during performance of the resync job and, in that case, any additional I/O resources may be identified in the context of using those specific I/O resources. The identified I/O resources may be grouped into types of resources, such as disk resources, intra-site network resources, and inter-site network resources. More, fewer, or different resource types may be used to categorize the identified I/O resources without departing from the description herein.

At 306, a quantity of available bandwidth slots (e.g., bandwidth slots 124-134) for each I/O resource of the identified one or more I/O resources is determined. In some examples, the available bandwidth slot data is provided by a resource status monitor component (e.g., resource status monitor 114) configured to consistently monitor and/or maintain available bandwidth data associated with the I/O resources of the system such that up-to-date available bandwidth data is provided for use in determining parallelism of resync jobs as described herein. The provided data may be converted to an abstracted bandwidth slot format by the monitor component or it may be provided in a raw bandwidth value form and then converted into the abstracted bandwidth slot format based on configuration data in the parallelism policy. In some examples, each bandwidth slot of the I/O resources is configured to accommodate one I/O task of most or all resync jobs, enabling I/O tasks to be performed in parallel based on a quantity of assigned bandwidth slots, as described herein.

At 308, the parallelism policy (e.g., parallelism policy 113) of the system is applied to the identified one or more I/O resources and the determined quantity of available bandwidth slots of each I/O resource, wherein the parallelism policy defines a process of identifying a bottleneck resource and calculating a parallel I/O value. In some examples, the parallelism policy includes rules, processes, algorithms, or the like for identifying a bottleneck resource based on identifying the I/O resource of the resync job that offers the fewest available bandwidth slots for use by the resync job. The number of bandwidth slots offered by a given I/O resource is based on the total number of bandwidth slots available and it may also depend on the number of different resync jobs or other I/O operations that are scheduled to use that I/O resource. Making such determinations may be based on the type of the I/O operations and resync jobs that are scheduled for performance and/or priority values assigned to the current resync job when compared to priority values of other scheduled jobs, as described herein. In further examples, the parallel I/O value is essentially calculated during the evaluation of the I/O resources to identify the bottleneck resource because the bottleneck resource is identified when the resource with the lowest parallel I/O value is found.

At 310, based on the application of the parallelism policy, a bottleneck resource of the one or more I/O resources associated with the resync job is determined, wherein the parallelism policy indicates the bottleneck resource will limit bandwidth usage of the resync job and at 312, a parallel I/O value of the resync job is calculated based on the determined bottleneck resource, wherein the parallel I/O value indicates a quantity of I/O tasks that can be performed in parallel during execution of the resync job based on the parallelism policy.

At 314, the resync job is caused to be executed using the one or more I/O resources, the execution of the resync job including performance of a quantity of I/O tasks in parallel based on the calculated parallel I/O value. In some examples, the execution of the resync job makes use of the calculated parallel I/O value throughout the process, such that the process attempts to perform I/O tasks in parallel up to the parallel I/O value. While the parallel I/O value is treated as a firm threshold in some examples, such that the parallel execution of I/O tasks does not exceed the parallel I/O value throughout the resync job, in other examples, the parallel I/O value is used as a softer guide value, enabling the parallel execution of I/O tasks of the resync job to exceed the parallel I/O value in some circumstances (e.g., additional bandwidth slots are donated or otherwise become available).

Figure 4:
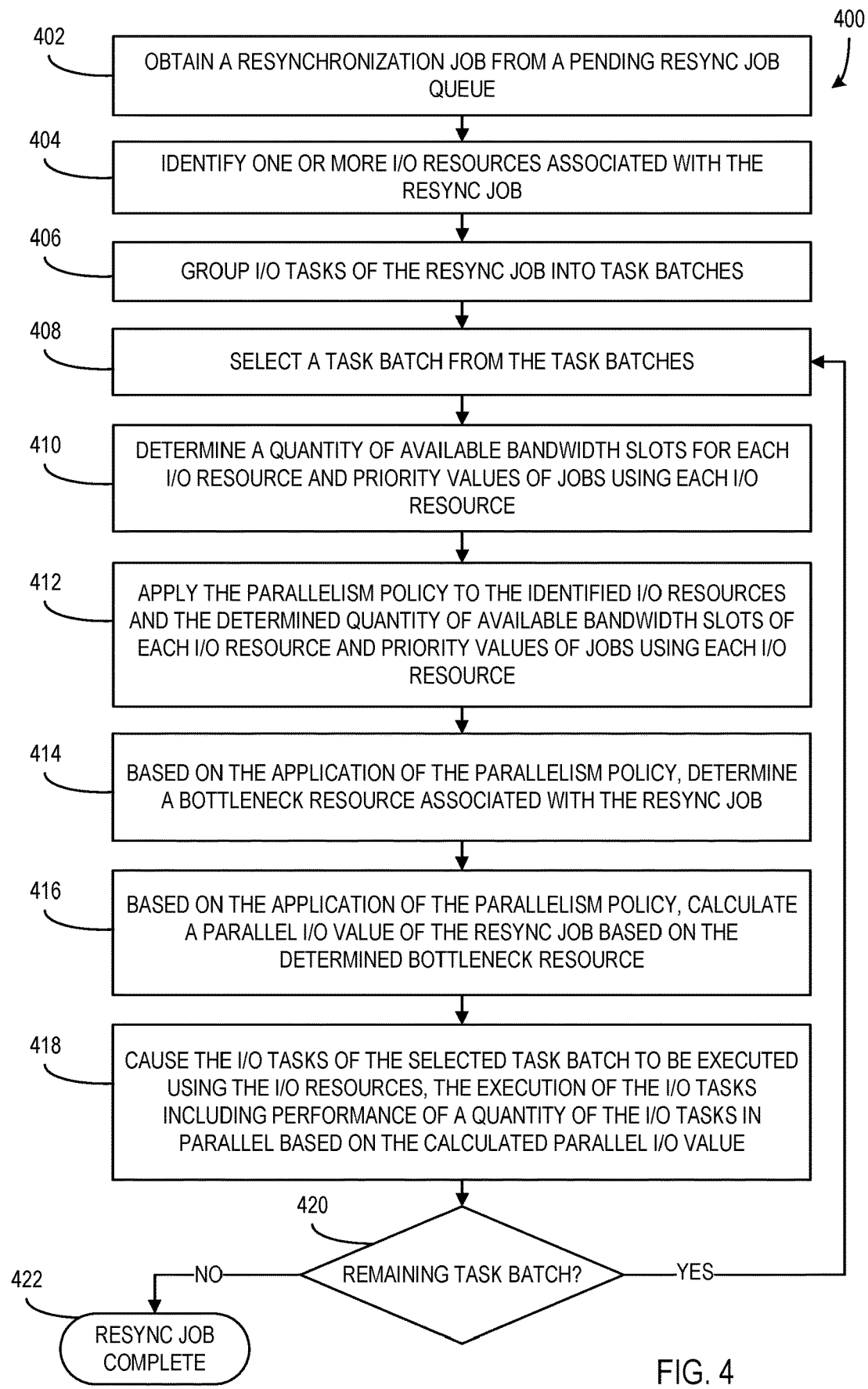
FIG. 4 is a flow chart illustrating a method of executing a resynchronization job based on a parallelism policy, including performing batches of I/O tasks of the resynchronization job in parallel, according to an embodiment.

FIG. 4 is a flow chart illustrating a method 400 of executing a resync job (e.g., resync jobs 106-108) based on a parallelism policy (e.g., parallelism policy 113), including performing batches of I/O tasks (e.g., I/O tasks 110) of the resync job in parallel, according to an embodiment. In some examples, the method 400 is performed by one or more components of a system, such as system 100 of FIG. 1. At 402-404, in which a resync job is obtained and the one or more I/O resources are identified in substantially the same manner as described above with respect to 302-304 of FIG. 3.

At 406, the I/O tasks of the resync job are grouped into task batches and, at 408, a first task batch is selected for performance from the task batches. In some examples, the grouping of I/O tasks into task batches is done based on the parallelism policy and/or other configuration details of the system. Alternatively, or additionally, the quantity of I/O tasks grouped into a task batch may be set to a default value at first and then dynamically change throughout the performance of the resync job to take advantage of the dynamically changing parallel I/O value as described below. For instance, the task batch size may be adjusted to be equal to, or a multiple of, the most recently calculated parallel I/O value, such that all the I/O tasks are enabled to efficiently run in parallel while avoiding waste of assigned bandwidth slots.

At 410-416, available bandwidth slots of the resources are determined, the parallelism policy is applied, a bottleneck resource is determined, and a parallel I/O value of the resync job is calculated in substantially the same manner as described above with respect to 306-312 of FIG. 3. It should be understood that, for each task batch selected in the method 400, these steps are repeated based on the most up-to-date resource data as determined at 410, such that the parallel I/O value of the resync job may be updated based on changes in the available bandwidth slots of the I/O resources and/or other changes that affect the performance of the resync job.

At 418, the I/O tasks of the selected task batch are caused to be executed using the one or more I/O resources, wherein the execution of the I/O tasks includes performance of a quantity of the I/O tasks in parallel based on the calculated parallel I/O value. It should be understood that the parallel I/O value used to determine a quantity of I/O tasks to perform in parallel is the most recently calculated parallel I/O value from 416.

At 420, if one or more task batches of the resync job remain, the process returns to 408 to select another task batch for performance. Alternatively, if no task batches of the resync job remain, the resync job is complete at 422. In some examples, completing the resync job includes updating status data or other data associated with the I/O resources used by the resync job to reflect that the resources are no longer in use by the resync job.

Figure 5:
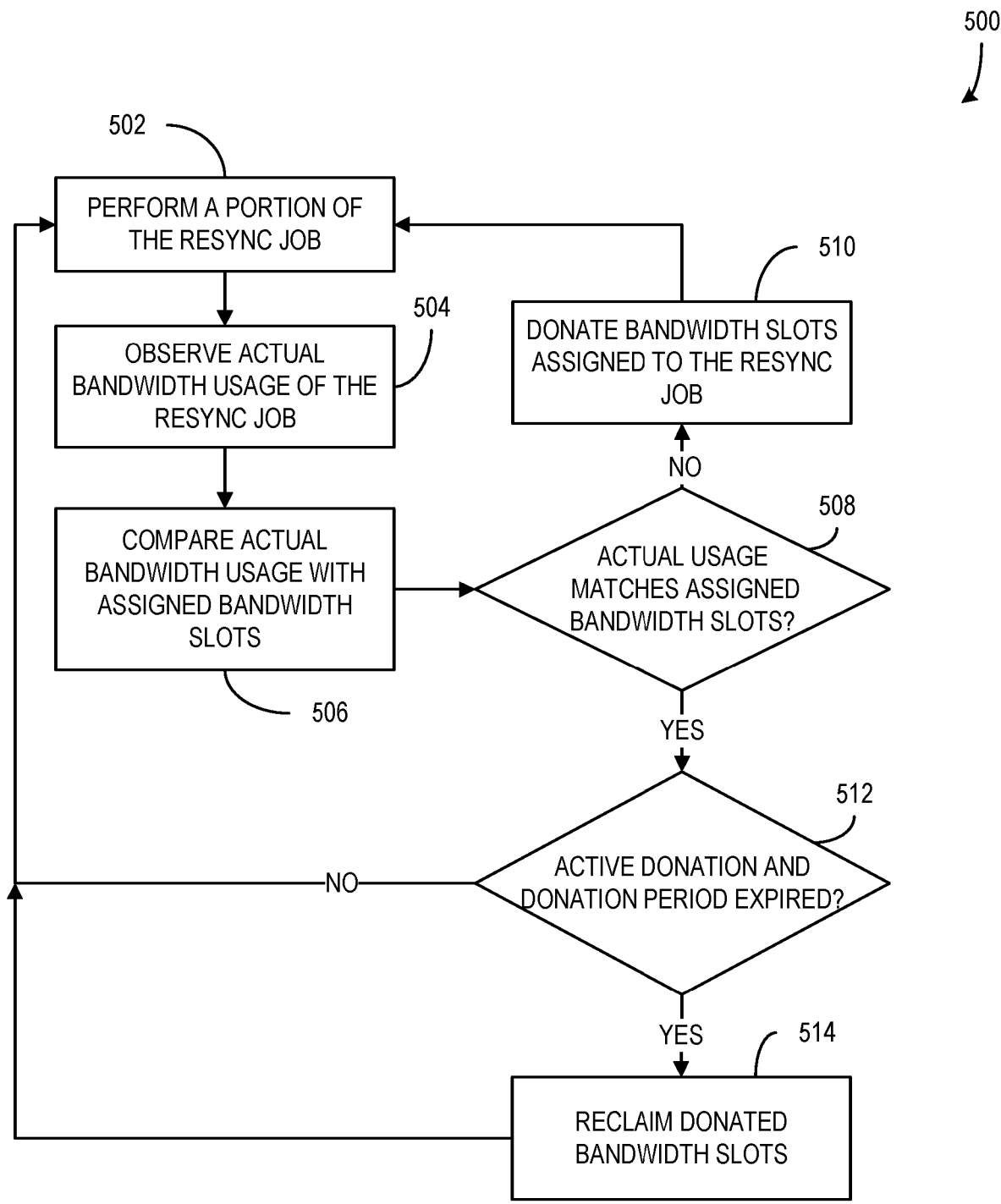
FIG. 5 is a flow chart illustrating a method of throttling parallel execution of a resynchronization job based on performance according to an embodiment.

FIG. 5 is a flow chart illustrating a method 500 of throttling parallel execution of a resync job based on performance according to an embodiment. In some examples, the method 500 is performed by one or more components of a system such as system 100 of FIG. 1. At 502, a portion of a resync job is performed on a distributed storage system as described herein. At 504, the actual bandwidth usage of the resync job is observed, and the data is collected and stored for analysis. The bandwidth usage of the resync job is monitored throughout the performance, so it should be understood that 502 and 504 are performed substantially simultaneously.

At 506, the actual bandwidth usage of the resync job is compared with the assigned bandwidth slots of the resync job and, at 508, if the actual usage matches the assigned bandwidth slots, the process proceeds to 512. Alternatively, if the actual usage does not match the assigned bandwidth slots, the process proceeds to 510. It should be understood that comparing the actual bandwidth usage to the assigned bandwidth slots may be based on a relative comparison of the performance of the resync job to the assigned bandwidth slots, rather than a direct comparison of the bandwidth usage to the potential bandwidth of the assigned bandwidth slots. For instance, the comparison may include comparing a percentage of bandwidth usage-based performance change of the resync job to the current number of assigned bandwidth slots. In such examples, the actual usage may be found to "match" the assigned bandwidth slots if the compared performance change exceeds a defined threshold based on the quantity of currently assigned bandwidth slots (e.g., the performance change associated with the currently assigned bandwidth slots does not indicate diminishing performance returns, as described above).

At 510, bandwidth slots assigned to the resync job are donated due to the detection of diminishing performance returns at the current number of assigned bandwidth slots for the resync job. In some examples, the number of donated bandwidth slots is based on an identified knee point of a performance change graph of the resync job, as described herein. Alternatively, the number of donated bandwidth slots may be based on a defined donation interval value. After the number of assigned bandwidth slots of the resync job has been updated based on the donation, the process returns to 502 to perform another portion of the resync job.

At 512, when the actual usage matches the assigned bandwidth slots, it is determined whether there is an active donation and whether a donation period associated with that active donation has expired. If there is no active donation (e.g., no assigned bandwidth slots of the resync job are currently donated) or if there is an active donation but the associated donation period has not expired, the process returns to 502 to perform another portion of the resync job.

Alternatively, if there is an active donation and the associated donation period has expired, the process proceeds to 514, wherein bandwidth slots that were assigned to the resync job but have previously been donated are reclaimed for use by the resync job. The quantity of bandwidth slots that are reclaimed may be based on a defined interval value and/or the number of bandwidth slots that have been donated. For example, if only a few slots have been donated, the resync job may reclaim them all, as the performance issue may have been based on a transient issue that has passed, while if there were many slots donated over several donation instances, the resync job may reclaim fewer, as the performance issue is likely to still be present. After the bandwidth slots are reclaimed and the number of assigned bandwidth slots of the resync job is updated, the process returns to 502 to perform another portion of the resync job.

Based on this adaptive feedback-based process, different resync jobs that make use of differently congested system components are throttled adaptively based on the congestion on those components. For example, two resync jobs on a single host but using different components (e.g., each job is in a separate fault domain) are assigned different number of bandwidth slots, and that number of slots may be adapted as described herein.

Additional Example Scenarios

Aspects of the disclosure enable various additional scenarios, such as next described.

In an example, a distributed storage system (e.g., system 100 of FIG. 1) has a cluster resource manager with a resync job queue storing a plurality of resync jobs that are pending. The resync engine of the cluster resource manager obtains a resync job from the queue and prepares to execute it. The I/O resources that will be used when executing the resync job are identified: a first disk resource, an intra-site network resource, and a second disk resource. The resync engine determines that the first disk resource has ten available bandwidth slots, the intra-site network resource has 20 available bandwidth slots, and the second disk resource has 12 available bandwidth slots.

The parallelism policy of the resync engine is applied to the I/O resources and the associated available bandwidth slots. Further, the resync job has a priority value of five, which is used in the application of the parallelism policy. The resync engine determines that the bottleneck resource of the three I/O resources is the second disk resource, despite the first disk resource having fewer available bandwidth slots, because the second disk resource is more contended by other resync jobs with higher priority values than the first disk resource. The resync engine calculates a parallel I/O value of three for the resync job, such that the resync job is assigned three available bandwidth slots of each of the I/O resources.

The resync engine groups I/O tasks of the resync job into a task batch that is sized based on the parallel I/O value of three. In this case, the first task batch includes three I/O tasks. The resync engine then proceeds to send instructions for performing the three I/O tasks of the task batch on the associated data storage cluster. The instructions include instructions to perform the three I/O tasks of the task batch at the same time, in parallel, using the assigned bandwidth slots.

After the first task batch is performed, the resync engine obtains up-to-date information about the available bandwidth slots of the I/O resources and re-determines the bottleneck resource and recalculates a parallel I/O value for the resync job based on that up-to-date information. At this point, the available bandwidth for the I/O resources has changed such that the intra-site network resource is now the bottleneck resource and the parallel I/O value is calculated as four, such that four bandwidth slots are assigned to the resync job. Another task batch is generated that includes four I/O tasks of the resync job, and the four I/O tasks of the task batch are then performed on the data storage cluster at the same time, in parallel using the assigned bandwidth slots.

Exemplary Operating Environment

Aspects of the disclosure are operable in both virtualized and non-virtualized environments. In virtualized examples that involve a hardware abstraction layer on top of a host computer (e.g., server), the hardware abstraction layer allows multiple containers to share the hardware resource. These containers, isolated from each other, have at least a user application running therein. The hardware abstraction layer thus provides benefits of resource isolation and allocation among the containers. In some examples, virtual machines (VMs) are used alternatively or in addition to the containers, and hypervisors are used for the hardware abstraction layer. In these examples, each VM generally includes a guest operating system in which at least one application runs.

For the container examples, it should be noted that the disclosure applies to any form of container, such as containers not including a guest operating system (OS), referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Figure 6:
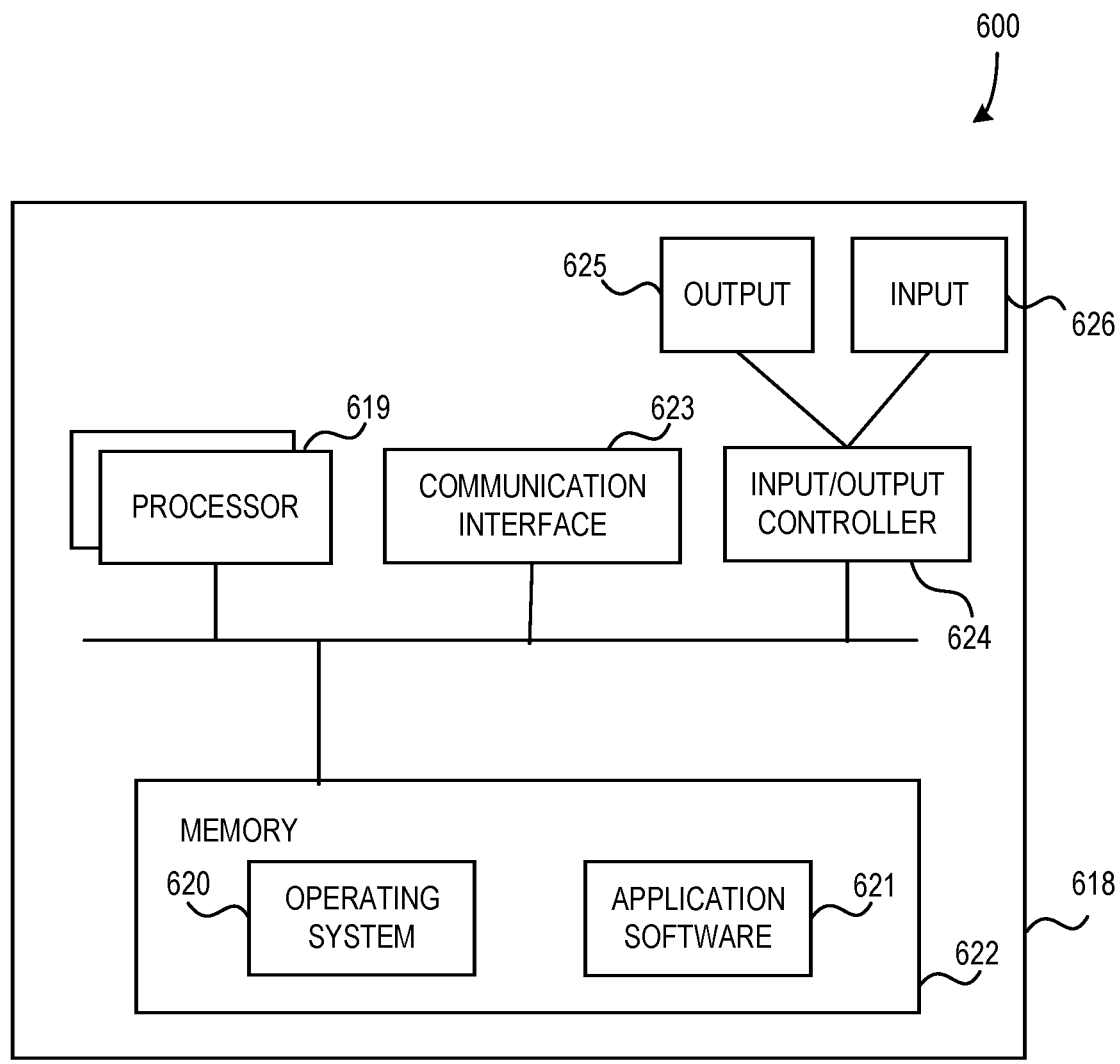
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, executing resync jobs, including performing I/O tasks of the resync jobs in parallel based on a parallelism policy, as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example computer system comprises: at least one processor; and at least one memory comprising computer program code, the at least one memory and the computer program code configured to, with the at least one processor, cause the at least one processor to: obtain a resync job from a pending resync job queue; identify one or more I/O resources of the distributed storage system that will be used during execution of the obtained resync job; determine a quantity of available bandwidth slots of each I/O resource of the identified one or more I/O resources; apply the parallelism policy to the identified one or more I/O resources and the determined quantity of available bandwidth slots of each I/O resource, wherein the parallelism policy defines a process of identifying a bottleneck resource and calculating a parallel I/O value; based on the application of the parallelism policy: determine a bottleneck resource of the one or more I/O resources associated with the resync job, wherein the parallelism policy indicates the bottleneck resource will limit bandwidth usage of the resync job; and calculate a parallel I/O value of the resync job based on the determined bottleneck resource and the quantity of available bandwidth slots of the determined bottleneck resource, wherein the parallel I/O value indicates a quantity of I/O tasks that can be performed in parallel during execution of the resync job based on the parallelism policy; and cause the resync job to be executed using the one or more I/O resources, the execution of the job including performance of a quantity of I/O tasks in parallel based on the calculated parallel I/O value, whereby bandwidth of the I/O resources of the distributed storage system is used efficiently and a rate at which the resync job is executed is increased.

A computerized method for performing resync jobs in a distributed storage system based on a parallelism policy comprises: obtaining, by a processor, a resync job from a pending resync job queue; identifying, by the processor, one or more I/O resources of the distributed storage system that will be used during execution of the obtained resync job; determining, by the processor, a quantity of available bandwidth slots of each I/O resource of the identified one or more I/O resources; applying, by the processor, the parallelism policy to the identified one or more I/O resources and the determined quantity of available bandwidth slots of each I/O resource, wherein the parallelism policy defines a process of identifying a bottleneck resource and calculating a parallel I/O value; based on the application of the parallelism policy: determining, by the processor, a bottleneck resource of the one or more I/O resources associated with the resync job, wherein the parallelism policy indicates the bottleneck resource will limit bandwidth usage of the resync job; and calculating, by the processor, a parallel I/O value of the resync job based on the determined bottleneck resource and the quantity of available bandwidth slots of the determined bottleneck resource, wherein the parallel I/O value indicates a quantity of I/O tasks that can be performed in parallel during execution of the resync job based on the parallelism policy; and causing, by the processor, the resync job to be executed using the one or more I/O resources, the execution of the job including performance of a quantity of I/O tasks in parallel based on the calculated parallel I/O value, whereby bandwidth of the I/O resources of the distributed storage system is used efficiently and a rate at which the resync job is executed is increased.

One or more non-transitory computer storage media comprise computer-executable instructions for performing resync jobs in a distributed storage system based on a parallelism policy that, upon execution by a processor, cause the processor to at least: obtain a resync job from a pending resync job queue; identify one or more I/O resources of the distributed storage system that will be used during execution of the obtained resync job; determine a quantity of available bandwidth slots of each I/O resource of the identified one or more I/O resources; apply the parallelism policy to the identified one or more I/O resources and the determined quantity of available bandwidth slots of each I/O resource, wherein the parallelism policy defines a process of identifying a bottleneck resource and calculating a parallel I/O value; based on the application of the parallelism policy: determine a bottleneck resource of the one or more I/O resources associated with the resync job, wherein the parallelism policy indicates the bottleneck resource will limit bandwidth usage of the resync job; and calculate a parallel I/O value of the resync job based on the determined bottleneck resource and the quantity of available bandwidth slots of the determined bottleneck resource, wherein the parallel I/O value indicates a quantity of I/O tasks that can be performed in parallel during execution of the resync job based on the parallelism policy; and cause the resync job to be executed using the one or more I/O resources, the execution of the job including performance of a quantity of I/O tasks in parallel based on the calculated parallel I/O value, whereby bandwidth of the I/O resources of the distributed storage system is used efficiently and a rate at which the resync job is executed is increased.

Alternatively, or in addition to the other examples described herein, examples include any combination of the following:
further comprising: grouping, by the processor, I/O tasks of the resync job into task batches, each task batch including one or more I/O tasks; wherein causing the resync job to be executed includes executing one task batch of the task batches of the resync job at a time, wherein determining the quantity of available bandwidth slots of each I/O resource and applying the parallelism policy to determine the bottleneck resource and calculate the parallel I/O value are performed in preparation for the execution of each task batch of the task batches of the resync job.

wherein a quantity of I/O tasks grouped into each task batch is based on the calculated parallel I/O value.

wherein the resync job includes a priority value; and wherein determining the bottleneck resource and calculating the parallel I/O value are based on a ratio of the priority value of the resync job to overall priority values of each I/O resource, wherein an overall priority value of an I/O resource is a sum of priority values of all jobs using the I/O resource.

further comprising: based on calculating the parallel I/O value, assigning, by the processor, a quantity of available bandwidth slots to the resync job, wherein the assigned available bandwidth slots are used by the resync job during execution of the resync job; collecting, by the processor, performance data of the resync job during execution of the resync job; based on determining, from the collected performance data, that the resync job has diminishing performance returns based on the quantity of assigned bandwidth slots, donating, by the processor, one or more of the bandwidth slots assigned to the resync job, wherein donated bandwidth slots are returned to a pool of available bandwidth slots and the quantity of assigned bandwidth slots of the resync job is reduced based on the donated bandwidth slots.

further comprising: based on a donation time period associated with donation of one or more bandwidth slots ending, reclaiming, by the processor, one or more donated bandwidth slots to the resync job, wherein the quantity of assigned bandwidth slots of the resync job is increased based on the reclaimed bandwidth slots.

wherein the one or more I/O resources include at least one disk resources, intra-site network resources, or inter-site network resources.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for obtaining, by a processor, a resync job from a pending resync job queue; exemplary means for identifying, by the processor, one or more I/O resources of the distributed storage system that will be used during execution of the obtained resync job; exemplary means for determining, by the processor, a quantity of available bandwidth slots of each I/O resource of the identified one or more I/O resources; exemplary means for applying, by the processor, the parallelism policy to the identified one or more I/O resources and the determined quantity of available bandwidth slots of each I/O resource, wherein the parallelism policy defines a process of identifying a bottleneck resource and calculating a parallel I/O value; based on the application of the parallelism policy: exemplary means for determining, by the processor, a bottleneck resource of the one or more I/O resources associated with the resync job, wherein the parallelism policy indicates the bottleneck resource will limit bandwidth usage of the resync job; and exemplary means for calculating, by the processor, a parallel I/O value of the resync job based on the determined bottleneck resource and the quantity of available bandwidth slots of the determined bottleneck resource, wherein the parallel I/O value indicates a quantity of I/O tasks that can be performed in parallel during execution of the resync job based on the parallelism policy; and exemplary means for causing, by the processor, the resync job to be executed using the one or more I/O resources, the execution of the job including performance of a quantity of I/O tasks in parallel based on the calculated parallel I/O value, whereby bandwidth of the I/O resources of the distributed storage system is used efficiently and a rate at which the resync job is executed is increased.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for performing resync jobs in a distributed storage system based on a parallelism policy, the method comprising:
    obtain a resync job from a pending resync job queue, wherein the resync job includes information describing a current data location and a destination data location between which data will be transferred during performance of the resync job;
    determine an input/output (I/O) path from the current data location to the destination data location;
    identify, based on the determined I/O path using the parallelism policy, a plurality of I/O resources of the distributed storage system that will be used during execution of the obtained resync job;
    logically divide, based on the parallelism policy, available bandwidth of the plurality of I/O resources into bandwidth slots;
    assign the bandwidth slots to the resync job for performing a plurality of I/O tasks of the resync job in parallel; and
    cause the plurality of I/O tasks of the resync job to be executed in parallel using the plurality of I/O resources identified in the determined I/O path based on the assigned bandwidth slots.

2. The computerized method of claim 1, wherein the I/O path includes a disk resource associated with the current data location, an intra-site network resource to transfer the data to a network resource on an edge of a site of the current data location, an inter-site network resource to transfer the data from the site of the current data location to a site of the destination data location, an intra-site network resource to transfer the data to a disk resource of the destination data location, and the disk resource of the destination data location.

3. The computerized method of claim 1, wherein determining the I/O path from the current data location to the destination data location comprises:
    identifying a plurality of I/O paths from the current data location to the destination data location; and
    selecting the I/O path from the plurality of I/O paths based on a path selection rule.

4. The computerized method of claim 3, wherein the path selection rule includes (1) selecting a most direct I/O path, (2) selecting the I/O path that includes fewest resources of a particular type, (3) selecting the I/O path that includes high-performing resources, and (4) selecting the I/O path with a highest available bandwidth of a bottleneck resource.

5. The computerized method of claim 1, further comprising: detecting a skewed usage of one or more of the plurality of I/O resources; and wherein the I/O path from the current data location to the destination data location is accurately determined using the detected skewed usage of the one or more of the plurality of I/O resources.

6. The computerized method of claim 1, wherein the assigned bandwidth slots to the resync job are dynamically adjusted based on a changing state of the plurality of I/O resources of the distributed storage system.

7. One or more non-transitory computer storage media having computer-executable instructions for performing resync jobs in a distributed storage system based on a parallelism policy that, upon execution by a processor, cause the processor to at least:
    obtain a resync job from a pending resync job queue, wherein the resync job includes information describing a current data location and a destination data location between which data will be transferred during performance of the resync job;
    determine an input/output (I/O) path from the current data location to the destination data location;
    identify, based on the determined I/O path using the parallelism policy, a plurality of I/O resources of the distributed storage system that will be used during execution of the obtained resync job;
    logically divide, based on the parallelism policy, available bandwidth of the plurality of I/O resources into bandwidth slots; and
    assign the bandwidth slots to the resync job for performing a plurality of I/O tasks of the resync job in parallel; and
    cause the plurality of I/O tasks of the resync job to be executed in parallel using the plurality of I/O resources identified in the determined I/O path based on the assigned bandwidth slots.

8. The one or more computer storage media of claim 7, wherein the I/O path includes a disk resource associated with the current data location, an intra-site network resource to transfer the data to a network resource on an edge of a site of the current data location, an inter-site network resource to transfer the data from the site of the current data location to a site of the destination data location, an intra-site network resource to transfer the data to a disk resource of the destination data location, and the disk resource of the destination data location.

9. The one or more computer storage media of claim 7, wherein determining the I/O path from the current data location to the destination data location comprises:
    identifying a plurality of I/O paths from the current data location to the destination data location; and
    selecting the I/O path from the plurality of I/O paths based on a path selection rule.

10. The one or more computer storage media of claim 9, wherein the path selection rule includes (1) selecting a most direct I/O path, (2) selecting the I/O path that includes fewest resources of a particular type, (3) selecting the I/O path that includes high-performing resources, and (4) selecting the I/O path with a highest available bandwidth of a bottleneck resource.

11. The one or more computer storage media of claim 7, wherein the computer-executable instructions, upon execution by the processor, further cause the processor to:
    detect a skewed usage of one or more of the plurality of I/O resources; and
    wherein the I/O path from the current data location to the destination data location is accurately determined using the detected skewed usage of the one or more of the plurality of I/O resources.

12. A system for performing resync jobs in a distributed storage system based on a parallelism policy, the system comprising:
    at least one processor; and
    at least one memory comprising computer program code, the at least one memory and the computer program code configured to, with the at least one processor, cause the at least one processor to:
        obtain a resync job from a pending resync job queue, wherein the resync job includes information describing a current data location and a destination data location between which data will be transferred during performance of the resync job;
        determine an input/output (I/O) path from the current data location to the destination data location;

identify, based on the determined I/O path using the parallelism policy, a plurality of I/O resources of the distributed storage system that will be used during execution of the obtained resync job;

logically divide, based on the parallelism policy, available bandwidth of the plurality of I/O resources into bandwidth slots;

assign the bandwidth slots to the resync job for performing a plurality of I/O tasks of the resync job in parallel; and cause the plurality of I/O tasks of the resync job to be executed in parallel using the plurality of I/O resources identified in the determined I/O path based on the assigned bandwidth slots.

13. The system of claim 12, wherein the I/O path includes a disk resource associated with the current data location, an intra-site network resource to transfer the data to a network resource on an edge of a site of the current data location, an inter-site network resource to transfer the data from the site of the current data location to a site of the destination data location, an intra-site network resource to transfer the data to a disk resource of the destination data location, and a disk resource of the destination data location.

14. The system of claim 12, wherein determining the I/O path from the current data location to the destination data location comprises:

identifying a plurality of I/O paths from the current data location to the destination data location; and selecting the I/O path from the plurality of I/O paths based on a path selection rule.

15. The system of claim 14, wherein the path selection rule includes (1) selecting a most direct I/O path, (2) selecting the I/O path that includes fewest resources of a particular type, (3) selecting the I/O path that includes high-performing resources, and (4) selecting the I/O path with a highest available bandwidth of a bottleneck resource.

16. The system of claim 12, the at least one memory and the computer program code configured to, with the at least one processor, further cause the at least one processor to:

detect a skewed usage of one or more of the plurality of I/O resources; and wherein the I/O path from the current data location to the destination data location is accurately determined using the detected skewed usage of the one or more of the plurality of I/O resources.

17. The system of claim 12, wherein the assigned bandwidth slots to the resync job are dynamically adjusted based on a changing state of the plurality of I/O resources of the distributed storage system.

\* \* \* \* \*